E. A. TURNER.
TRANSFERABLE CRADLE.
APPLICATION FILED SEPT. 24, 1918.
1,344,009.
Patented June 22, 1920.
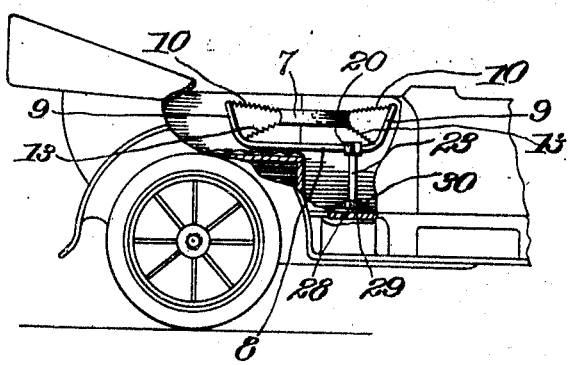
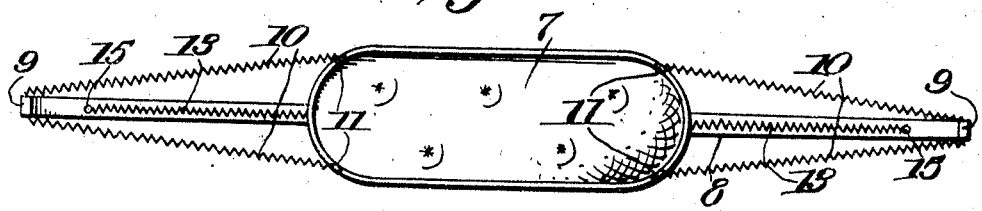
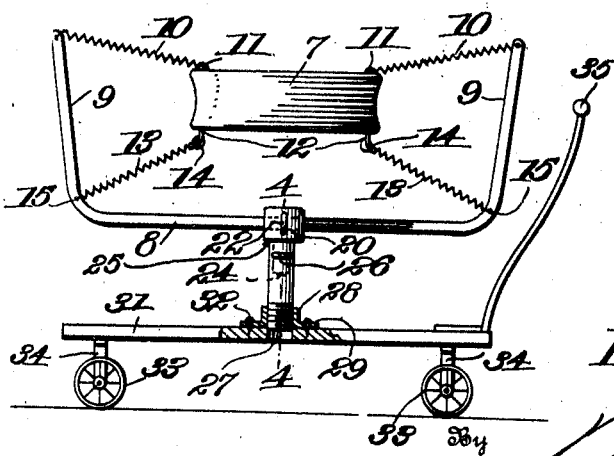
Inventor
E. A. Turner,
Attorney.

UNITED STATES PATENT OFFICE.

EDWARD A. TURNER, OF CASPER, WYOMING.

TRANSFERABLE CRADLE.

1,344,009.  Specification of Letters Patent.  Patented June 22, 1920.

Application filed September 24, 1918. Serial No. 255,508.

*To all whom it may concern:*

Be it known that I, EDWARD A. TURNER, a citizen of the United States, residing at Casper, in the county of Natrona and State of Wyoming, have invented certain new and useful Improvements in Transferable Cradles, of which the following is a specification.

My invention relates to a transferable cradle structure.

A main object is to provide a device of this kind in which the baby may comfortably rest to relieve the nurse or mother, especially during travel of an automobile or other vehicle by which it is carried.

Additional objects are to provide such an article having means to counteract the force of jolts of the vehicle during travel, preferably having springs detachable from the cradle proper to permit swinging of the cradle; one adapted to coöperate with a plurality of bases or supporting means disposed in suitable locations as in an automobile and in the home; one which is adjustable according to adjacent structure, and one which is generally improved and may be packed in minimum space, and is simple and durable in construction and capable of manufacture at low cost.

With the above and additional objects, which will appear hereinafter, in view, the invention has been embodied in one preferred form as illustrated in accompanying drawings.

In said drawings:—

Figure 1 is a fragmentary side elevation of an automobile showing my improvement in connection therewith;

Fig. 2 is a side elevation showing my improvement fashioned after a baby carriage;

Fig. 3 is a top or plan view of the cradle proper and its support;

Fig. 4 is a cross sectional view on the line 4—4 of Fig. 2;

Fig. 5 is a detailed side elevation of the form of clasp which may be employed for fastening the lower springs to the cradle, and Fig. 6 is a plan view of a supporting base which may be used.

In carrying out my invention, a cradle or carrier 7, of any suitable shape or material, is provided. As usual, the cradle will be provided with a mattress or equivalent soft material so as to provide a comfortable reposing structure for the baby. A frame is also provided having an elongated bar 8, preferably square or rectangular in cross section, as shown in Fig. 4, and arms 9 integral therewith and bending upwardly therefrom. By any suitable means, the cradle is resiliently supported by this frame. For instance, springs 10 are fastened at the upper extremities of the arms 9 and to eyelets 11 along the upper edge of the cradle. It is to be noted that two of the springs 10 are fastened to each end of the cradle and equidistantly from the median line thereof and on opposite sides. The springs 10 of each pair extend inwardly so as to fasten to the arms 9 as shown in Fig. 3. This arrangement of the springs will normally hold the cradle level. Along the longitudinal median line of the cradle, and extending from the bottom thereof, are eyelets 12 to which springs 13 may be detachably fastened as by means of clasps or snaps 14. Springs 13 are in the same vertical plane and fastened to the arms 9 as at 15.

Snaps or fastening members 14 may be of any suitable construction. However, as shown in Fig. 5, they may consist of a hook 16 to extend through the eyelet 12, an eyelet 17 to which the springs 13 are fastened, and an inwardly yielding spring 18 fastened as at 19 to the hook 16. In order to attach or detach springs 13 from the eyelets 12, the leaf springs 18 are simply manually manipulated to permit the hooks 16 to move properly relatively to the eyelets.

Bar 8 is slidably mounted diametrically of an attaching head 20, in a square or rectangular recess 21 thereof. A binding screw or other fastening 22 may be screw threaded in the head 20 and adapted to abut and be tightened against the bar 8 to fasten it against sliding movement. Head 20 is adapted to connect with and be supported by a suitable pedestal 23. This pedestal 23 is preferably hollow and adapted to receive a tenon or projection 24, of less diameter than the head 20, integral therewith and depending therefrom. A shoulder 25 is provided at the junction of the head and its tenon, adapted to rest on the pedestal as shown in Fig. 4. A screw or other fastening 26 is threaded into the pedestal and operable to bind or engage with the tenon 24 to fasten it against movement relatively to the pedestal in order to securely fasten the tenon, head and frame and cradle against detachment.

The pedestal may be mounted in any suitable manner but preferably is provided with screw threads at 27 to engage screw threads on the interior of a collar 28, forming part of a base 29.

It will be realized that the cradle and its frame is detachably connected to the pedestal by means of the tenon 24 and screw 26. In view of this fact, the pedestal may be fastened to any suitable structure and at any desired location. For instance, as shown in Fig. 1, the base 29 is fastened by set screws 30 directly to the floor of an automobile. Also, in order that the device may occupy as little space as practical, when the cradle is not to be carried by the automobile, the pedestal may be unscrewed at 27 from the base, thus leaving the base the only part projecting above the floor of the automobile. There are, therefore, no undue obstructions in the automobile while the device is not in use. Attention may also be called to the fact, that the pedestal, when the device is used for an automobile, is usually considerably longer than in other instances, inasmuch as the frame should be supported, preferably, over the back seat as shown in Fig. 1 as this position will usually be most convenient.

In the home, a pedestal may be provided and also a base such as 30, fastened at any suitable location and to any desired part. As well, when the parent is paying a visit or is on an outing, the base 29 may be taken along and fastened temporarily to any support. As well, the base may be carried by a perambulator so that the device will substantially be a baby carriage, as suggested in Fig. 2. The perambulator shown in that figure is merely by way of suggestion. It may have a platform 31 to which the base is secured by screws 32. Wheels 33 may be mounted by suitable axles carried by springs 34, and a handle 35 fastened to the platform 31 by any suitable means, may be used to propel the perambulator.

While traveling in an automobile, springs 10 and 13 will counteract the force of the jolts. Springs 13 hold the cradle against undue lateral movement, not only when disposed in an automobile, but regardless of its particular place. However, when the device is to be used as a swing, the snaps 14 are detached from the eyelets 12 to avoid their counteracting effect to swinging.

Particularly in an automobile, it is desirable that the device be adjustable longitudinally of the pedestal and also radially of the head 20, in order that the device may accommodate itself to surrounding structure. It is for this reason that the bar 8 is slidable radially of the head 20 and fastened by the set screw 22 and that the tenon 24 is round in cross section and fastened by the set screw 26.

As a complete outfit, I prefer to use a base and pedestal for an automobile; a base and pedestal for the home; and optionally a base and pedestal for a perambulator, in addition to one frame and cradle supported thereby.

Additional uses, objects and advantages will be apparent in view of the foregoing description. As I have shown and described merely one preferred embodiment, it is to be understood that changes in the details thereof may be resorted to within the spirit and scope of the invention.

I claim:—

1. A device of the class described having a cradle, a frame having a bar polygonal in cross section, and arms rising from the bar, means suspending the cradle from the arms, means carried by the frame and detachably connected to the cradle to counteract swinging movement thereof, a head in which said bar is slidably mounted, means to rigidly secure the head to the bar, a tenon depending from the bar, a pedestal into which said tenon detachably extends, said head resting on said pedestal, means to secure the head to the pedestal against turning movement, and a base detachably mounting the pedestal.

2. A cradle supporting structure including a base, a hollow pedestal detachably connected therewith, a head having a reduced extension telescopically received in the upper end of the pedestal, a horizontal bar polygonal in cross section passing through an opening in said head, said bar having its free extremities bent upwardly to form vertically extending arms, a cradle suspended between the arms by means of springs, means to adjust the relative position of the bar, and means to control the revolving movement of the head.

3. A cradle supporting structure including a base, a hollow pedestal detachably connected therewith, a head having a reduced extension telescopically received in the upper end of the pedestal, a horizontal bar polygonal in cross section passing through an opening in said head, said bar having its free extremities bent upwardly to form vertically extending arms, a cradle suspended between the arms by means of springs secured on opposite sides of the median line, and springs secured to the median line of the cradle and connected at their opposite ends to the arms, adapted to counteract the swinging movement of the cradle.

In testimony whereof, I have affixed my signature in the presence of two witnesses.

EDWARD A. TURNER.

Witnesses:
HARVEY R. SMITH,
O. E. RODDA.